Patented Sept. 7, 1948

2,448,979

UNITED STATES PATENT OFFICE 2,448,979

PROCESS FOR THE PRODUCTION OF $\beta,\beta'$-DICYANO DIETHYL ETHER

Heinrich Hopff and Wilhelm Rapp, Ludwigshafen-on-Rhine, Germany; vested in the Attorney General of the United States No Drawing. Application May 23, 1941, Serial No. 394,840. In Germany June 19, 1940

7 Claims. (Cl. 260—465.6)

The present invention relates to a process for the production of $\beta,\beta'$-dicyano-diethyl ether.

It has already been described that by adding aromatic and aliphatic compounds which contain hydroxyl groups on to $\alpha,\beta$-unsaturated nitriles, $\beta$-cyano-alkyl ethers are obtained as the addition products.

We have now found that by reacting acrylic nitrile with water $\beta,\beta'$-dicyano-diethyl ether is obtained in a very good yield; i. e. by the addition of 2 mols of the acrylic nitrile on to 1 mol of water a dinitrile comprising an oxygen bridge in the carbon chain is formed according to the following equation:

$2CH_2=CH-CN+H_2O \rightarrow$
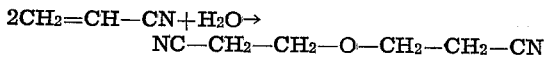
$NC-CH_2-CH_2-O-CH_2-CH_2-CN$

The reaction takes place at a comparatively low temperature, preferably at about 20° to about 80° C. in the presence of small amounts of an alkaline catalyst, such as the alkali metal and alkaline-earth metal hydroxides and the alkali metal and alkaline-earth metal salts of weak acids. It is preferable to add to the reaction mixture a small quantity of a stabilizer inhibiting the polymerization of the unsaturated nitrile, as for example hydroquinone.

The following example serves to illustrate how the present invention may be carried out in practice, but the invention is not restricted to the said example. The parts are by weight.

Example

A mixture of 106 parts of acrylic nitrile, 18 parts of water, 0.05 part of hydroquinone and 0.3 part of pulverised sodium hydroxide is stirred at between 55° and 60° C. for about 2 hours. The reaction mixture is then neutralized with dilute sulphuric acid, whereupon the aqueous layer is separated and the oily reaction product is distilled. After a first runnings of a slight amount of unconverted acrylic nitrile, 62 parts of $\beta,\beta'$-dicyano-diethyl ether pass over at from 150° to 155° C. under a pressure of 1.5 millimeters (mercury gauge).

What we claim is:

1. A process for the production of $\beta,\beta'$-dicyano-diethyl ether which comprises reacting acrylic nitrile with water in the presence of small amounts of an alkaline catalyst.

2. A process for the production of $\beta,\beta'$-dicyano-diethyl ether which comprises reacting acrylic nitrile with water in the presence of small amounts of an alkali metal hydroxide.

3. A process for the production of $\beta,\beta'$-dicyano-diethyl ether which comprises reacting acrylic nitrile with water in the presence of small amounts of an alkaline catalyst and of a stabilizer inhibiting the polymerization of the acrylic nitrile.

4. A process for the production of $\beta,\beta'$-dicyano-diethyl ether which comprises reacting acrylic nitrile with water in the presence of small amounts of an alkaline catalyst and of hydroquinone.

5. A process for the production of $\beta,\beta'$-dicyano-diethyl ether which comprises reacting acrylic nitrile with water in the presence of small amounts of an alkali metal hydroxide and of hydroquinone.

6. A process for the production of $\beta,\beta'$-dicyano-diethyl ether which comprises reacting acrylic nitrile with water in the presence of small amounts of an alkaline catalyst at a temperature between 20° and 80° C.

7. Process which comprises reacting two mols of acrylonitrile with one mol of water in the presence of an alkaline catalyst.

HEINRICH HOPFF.
WILHELM RAPP.

REFERENCES CITED

The following references are of record in the file of this patent:

UNITED STATES PATENTS

| Number | Name | Date |
|---|---|---|
| 2,171,795 | Kautter | Sept. 5, 1939 |